United States Patent
Fujii et al.

(10) Patent No.: US 12,459,246 B2
(45) Date of Patent: Nov. 4, 2025

(54) MULTILAYER POLYESTER FILM, A LAMINATE MADE OF THIS FILM AND OF A METAL FOIL, METHOD FOR MANUFACTURING SAID FILM AND SAID LAMINATE, AND CONTAINER MADE FROM SAID LAMINATE

(71) Applicant: TORAY FILMS EUROPE, Saint Maurice de Beynost (FR)

(72) Inventors: Hideki Fujii, Mishima (JP); Valérie Lacrampe, Orlienas (FR); Audrey Ulrich Saint-Pierre, Lyons (FR); Julien Faldysta, Reyrieux (FR)

(73) Assignee: TORAY FILMS EUROPE, Saint Maurice de Beynost (FR)

( * ) Notice: Subject to any disclaimer, the term of this patent is extended or adjusted under 35 U.S.C. 154(b) by 889 days.

(21) Appl. No.: 16/322,034

(22) PCT Filed: Aug. 5, 2016

(86) PCT No.: PCT/IB2016/001285
§ 371 (c)(1),
(2) Date: Jan. 30, 2019

(87) PCT Pub. No.: WO2018/025058
PCT Pub. Date: Feb. 8, 2018

(65) Prior Publication Data
US 2019/0184692 A1    Jun. 20, 2019

(51) Int. Cl.
*B32B 27/36* (2006.01)
*B32B 15/09* (2006.01)
(Continued)

(52) U.S. Cl.
CPC .............. *B32B 27/36* (2013.01); *B32B 15/09* (2013.01); *B32B 27/08* (2013.01); *B32B 27/20* (2013.01);
(Continued)

(58) Field of Classification Search
CPC ........... B32B 7/03; B32B 15/09; B32B 15/20; B32B 27/08; B32B 27/20; B32B 27/36;
(Continued)

(56) References Cited

U.S. PATENT DOCUMENTS

| 4,041,206 A | 8/1977 | Tsunashima et al. |
| 8,808,844 B2 | 8/2014 | Niederst et al. |
| 2016/0145462 A1 | 5/2016 | Kawamura et al. |

FOREIGN PATENT DOCUMENTS

| EP | 0 408 042 B1 | 9/1995 | |
| EP | 677382 A2 * | 10/1995 | ............... B32B 1/02 |

(Continued)

OTHER PUBLICATIONS

English Machine Translation of the description of KR-20090120079-A obtained from ESPACENET (Year: 2009).*
(Continued)

*Primary Examiner* — Eli D. Strah
*Assistant Examiner* — Thomas J Kessler
(74) *Attorney, Agent, or Firm* — Oliff PLC

(57) ABSTRACT

A multilayer transparent film with successively: an amorphous layer C of copolyester PET-G-which the diol units include Ethylene Glycol -EG- units and CycloHexaneDiMethanol -CHDM- units; a crystalline/crystallizable layer B with: a copolyester PET-X which the diol units include Ethylene Glycol -EG- units and which the acid units include Terephtalic Acid -TA- units and units of at least one Dicarboxylic Acid Different From Terephtalic Acid [DADFTA units], the DADFTA units being chosen in the group con-
(Continued)

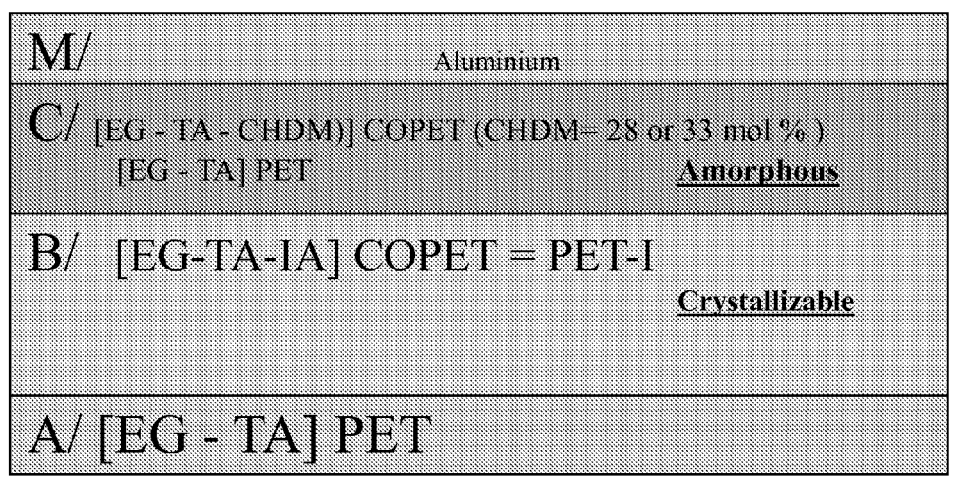

sisting of Isophtalic Acid -IA-units, Sebacic Acid -SA-units, Adipic Acid -AA-units, and mixtures thereof; and possibly a polyester PolyEthyleneTerephtalate PET; optionally a layer A, identical or different from the layer B, wherein the concentration of the CHDM units in the layer C is between 15 and 34 mol % and the melting temperature of layer B is between 180 and 245° C. Also a manufacturing method of the film and its applications for the manufacture of containers.

20 Claims, 1 Drawing Sheet

(51) Int. Cl.
    *B32B 27/08*     (2006.01)
    *B32B 27/20*     (2006.01)
    *B32B 38/00*     (2006.01)
    *C08G 63/183*     (2006.01)
    *C08G 63/199*     (2006.01)

(52) U.S. Cl.
    CPC ........ *B32B 38/0012* (2013.01); *C08G 63/183* (2013.01); *C08G 63/199* (2013.01); *B32B 2038/0028* (2013.01); *B32B 2264/102* (2013.01); *B32B 2270/00* (2013.01); *B32B 2307/20* (2013.01); *B32B 2307/518* (2013.01); *B32B 2307/702* (2013.01); *B32B 2367/00* (2013.01); *B32B 2439/00* (2013.01)

(58) Field of Classification Search
    CPC ........ B32B 38/0012; B32B 2038/0028; B32B 2038/0048; B32B 2264/102; B32B 2270/00; B32B 2307/20; B32B 2307/518; B32B 2307/702; B32B 2307/704; B32B 2367/00; B32B 2439/00; C08G 63/183; C08G 63/199
    See application file for complete search history.

(56) References Cited

FOREIGN PATENT DOCUMENTS

| | | |
|---|---|---|
| EP | 0 897 794 A1 | 2/1999 |
| EP | 0 962 483 A1 | 12/1999 |
| EP | 0 515 096 B2 | 9/2008 |
| EP | 2 163 382 A1 | 3/2010 |
| KR | 20090120079 A * | 11/2009 |
| WO | 00/46026 A1 | 8/2000 |

OTHER PUBLICATIONS

Murphy, J., "Chapter 9: Modifying Specific Properties: Resistance to Light—UV Stabilizers," Additives for Plastics Handbook, 2001, pp. 107-114.

Jan. 4, 2017 International Search Report issued in International Patent Application No. PCT/IB2016/001285.

* cited by examiner

| M/ | Aluminium |
|---|---|
| C/ | [EG - TA - CHDM)] COPET (CHDM= 28 or 33 mol %)<br>[EG - TA] PET  Amorphous |
| B/ | [EG-TA-IA] COPET = PET-I  Crystallizable |
| A/ | [EG - TA] PET |

MULTILAYER POLYESTER FILM, A LAMINATE MADE OF THIS FILM AND OF A METAL FOIL, METHOD FOR MANUFACTURING SAID FILM AND SAID LAMINATE, AND CONTAINER MADE FROM SAID LAMINATE

FIELD OF THE INVENTION

This invention relates to multilayer (co)polyester films, in particular aromatic polyester films such as polyethylene terephthalate (PET) or polyethylene naphthalate (PEN) or polybutylene terephthalate (PBT), said (co)polyester films having preferably a biaxial orientation.

These multilayer (co)polyester films are very widely used on account of their well-known excellent properties of thermal stability, dimensional stability, chemical resistance and relatively high surface energy notably as films for laminates comprising a metallic sheet. These laminates are used in packaging applications: manufacture of containers, particularly foods containers like metal cans.

The invention also relates to the manufacture and the use of these polyester films and of these laminates metal/polyester films, as well as to the containers made from these laminates.

DESCRIPTION OF THE TECHNICAL PROBLEM AND PRIOR ART

The colamination of polyester films on metal substrates or sheets is an application under development. Polyester film/metal sheet laminates are useful in particular as raw material for the packaging industry.

In this application, there is a need for biaxially oriented multilayer transparent polyester film, which can form a solid coating composition for use on the exterior and interior of food and beverage containers that exhibits the advantageous properties of adhesion, flexibility, chemical resistance, and corrosion inhibition, and that is economical and does not adversely affect the taste or other esthetic properties of sensitive foods and beverages packaged in the container. The existing organic solvent-based coating compositions complies with these specifications but have the major drawback to be particularly detrimental in respect of the environmental and toxicological aspects, due to the organic solvents.

U.S. Pat. No. 8,808,844B2 discloses an article comprising: a metal sheet, and a biaxially oriented polymeric film heat-bonded to at least one major surface of the metal sheet. The polymeric film comprises:
1. a first adhesive and amorphous layer adjacent the metal sheet comprising one or more polyester materials: e.g. 33 wt % of PET (polyester EG-TA) and 67 wt % of PET-G (copolyester EG-CHDM-TA);
2. a second layer (sometimes called the "core" layer) comprising a majority by weight of one or more crystallizable polyester-based polymers: e.g. 82 wt % of PET (polyester EG-TA), 15 wt % of PET-G (copolyester EG-CHDM-TA), 2.7 wt % of a polyamide and 0.3 wt % of cobalt salt;
3. and third layer (top layer) comprising 67 wt % of PET (polyester EG-TA), 32 wt % of PET-G (copolyester EG-CHDM-TA) and 1 wt % of wax blend.

[EG: Ethylene-Glycol; TA: Terephthalic Acid; CHDM: Cyclohexane Dimethanol]

The thickness of the first layer is in the range of about 5 to about 40% of the overall film thickness, the thickness of the second layer in the range of about 20 to 95% of the overall film thickness, and the thickness of any optional other layers, if present, is up to about 40% of the film overall thickness.

Such multilayer polyester films which are intended to form laminated packaging raw materials, are required to have the following properties:
- -a- low feathering, i.e low (<0.8 mm) or no formation of feathers of multilayer polyester film when the lid of a metal/multilayer polyester film can is perforated by means of a tab.
- -b- high adhesion metal/multilayer polyester film, even at low lamination temperature with metal foil. That means no delamination between the metal foil and the multilayered polyester film.
- -c- absence or low migration of components from the multilayer polyester film, to the content of the food container made of a laminate metal/multilayer polyester film. There should be no adsorption of aroma components from the can contents by the film, nor will the flavor of the contents be harmed by materials dissolved out of the film
- -d- resistance to corrosion, especially acid corrosion.
- -e- resistance to heat treatment (pasteurization) process to which the filled cans made from said laminate are eventually subjected. Unsatisfactory sterilisation resistance appears
    - -1st- as haziness in the otherwise clear coatings, an effect called "blushing";
    - -2nd- delamination.
- -f- high tensile strength.
- -g- formability: sufficient flexibility to resist to stamping and molding of the laminate metal/multilayer polyester film during the manufacture of containers (cans). No defects such as pin holes or cracks should be produced following fabrication. The polyester film should not separate away, or show cracking or pin holes generation when the metal can is subject to impact.

Multilayer polyester films and their corresponding laminates with metal, according to U.S. Pat. No. 8,808,844B2 can be improved in particular with regards to these properties -a- to -g-.

An object of this invention consists in providing such improved multilayer polyester films and metal laminates made therefrom.

OBJECTIVES OF THE INVENTION

In this context, one of the essential objectives of this invention is to provide an improved multilayer polyester films that improves at least one of the following properties:
- -a- feathering,
- -b- adhesion metal/multilayer polyester film,
- -c- absence or low migration,
- -d- resistance to acid corrosion,
- -e- resistance to heat treatment (pasteurization),
- -f- high tensile strength,
- -g- formability.

Another objective of the invention is to provide a laminate of metal/biaxial oriented multi-layered polyester film, having said -a- to -g- features and making it possible to produce, easily and cheaply, from said laminate, containers like metal cans for food packaging or industrial application by usual forming process like for example Draw Redraw, Draw & Ironing and Draw and Wall Ironing Another objective of the invention is to provide a method for obtaining a multi-layered polyester film which satisfies the above objectives, said method being simple to implement, cheap and industrial.

Another objective of the invention is to provide a method for manufacturing a laminate consisting of a metal sheet bonded to the abovementioned improved multilayered polyester film.

Another objective of the invention is to provide containers (cans) made from said laminate as well as their manufacture method.

BRIEF DESCRIPTION OF THE INVENTION

These objectives, among others, are achieved by this invention which relates, in a first aspect to a multilayer biaxially oriented polyester film comprising successively:
- -C- at least one amorphous layer C comprising at least one copolyester, preferably a PET-G-, which the diol units include Ethylene Glycol -EG- units and Cyclo-HexaneDiMethanol -CHDM- units;
- -B- at least one layer B comprising:
  at least one copolyester CP1, preferably a PET-X, which the diol units include Ethylene Glycol -EG- units and which the acid units include Terephtalic Acid -TA- units and units of at least one Dicarboxylic Acid Different From Terephtalic Acid [DADFTA units], said DADFTA units being preferably chosen in the group consisting of Isophtalic Acid -IA-units, Sebacic Acid -SA-units, Adipic Acid -AA-units, Dimer Acid -DA-units, Napththalene dicarboxylic Acid -NA-units and mixtures thereof; and
  possibly at least one polyester PE1, preferably a Poly-EthyleneTerephtalate PET;
- -A- optionally at least one layer A, identical or different from the layer B and comprising at least one polyester PE2, preferably at least one polyester, preferably a PolyEthyleneTerephtalate PET, and possibly at least one copolyester CP2, preferably a PET-X which the diol units include Ethylene Glycol -EG- units and which the acid units include Terephtalic Acid -TA-units and units of at least one Dicarboxylic Acid Different From Terephtalic Acid [DADFTA units], said DADFTA units being preferably chosen in the group consisting of Isophtalic Acid -IA-units, Sebacic Acid -SA-units, Adipic Acid -AA-units, Dimer Acid -DA-units, Napththalene dicarboxylic Acid -NA-units and mixtures thereof;

wherein
i. the concentration of the CHDM units in the layer C is comprised between 5 and 50 mol %, preferably between 10 and 40 mol %, and more preferably between 15 and 35 mol %;
ii. the melting temperature of the layer B is comprised between 180 and 245° C.

It was a surprising discovery that the combination of the features (i)&(ii) is very important to the performance of the film. Said combination provides greater adhesion than comparable polymers when laminating to substrates, especially metallic substrates, such as aluminum and steel. This increased bonding strength gives rise to laminate structures that can adequately be applied and bonded to commercially available substrates using commercially available equipment. And another surprising benefit of the combination of the features (i)&(ii) is the ability to provide a laminated film having excellent feathering properties. An absence of coating feathering is desired in certain end uses such as, for example, easy-open can ends for food or beverage cans. The production of such can ends typically includes pre-scoring of the metal substrate, which subsequently allows for the opening of the can end using a pull tab attached to a rivet of the can end to enable consumption of the packaged food or beverage product. The use of this scoring technique requires that both the substrate and the applied coating tear easily and cleanly. The absence of clean tearing is often referred to as "feathering" (or haring) due to the presence of unsuitable amounts of residual coating across the opening of the can. It is generally undesirable for the interior coating to display appreciable feathering, as it can be esthetically unpleasing to consumers of the packaged food or beverage product. As such it is desirable that coatings used for the interior of easy-open food or beverage can ends do not display appreciable feathering.

The tear resistance after heat treatment is another asset of the laminate metal/polyester including the film according to the invention, as well as the resistance to the acid media and non crystallization during post heating (pasteurization,). Many coated articles used in the food packaging industry undergo a post-heating step such as pasteurization or retort whereby the article is exposed to steam or water in the temperature range of 80-130° C. During this pasteurization, crystallizable polyesters will tend to display some level of crystallization which can lead to discoloration, cracking, crazing or reduction in adhesion. Any of these defects will reduce the overall quality of the laminate and can cause the article to be rejected by a consumer.

Low or absence of migration and formability are also present in the laminate metal/polyester including the film according to the invention.

In a preferred embodiment, the film according to the invention is characterized in that the concentration of the DADFTA units in the layer B is greater than or equal to 1 mol %, preferably comprised between 2 and 50 mol %, and more preferably comprised between 3 and 25 mol %.

According to an advantageous variant, the layer B and/or the layer A comprise(s):
at least one copolyester CP3 different from the CP1 and/or from CP2, preferably a PBT-X which the diol units include Butylene Glycol -BG- units and which the acid units include Terephtalic Acid -TA- units and units of at least one DADFTA, said DADFTA units being preferably chosen in the group consisting of Isophtalic Acid -IA-units, Sebacic Acid -SA-units, Adipic Acid -AA-units, Dimer Acid -DA- units, Napththalene dicarboxylic Acid -NA-units and mixtures thereof; and
possibly at least one polyester PolyButyleneTerephtalate PBT.

In a particular embodiment wherein the film according to the invention comprises a layer A different from the layer B, wherein the layer A is crystallizable layer of polyester resin including at least 50% by weight of Poly-Ethylene Terephthalate (PET).

According to an outstanding feature, at least one of the layers C,B,A, preferably the layer B and/or the layer A, incorporates filler particles which have a median diameter D50 in the following ranges given herein in an increasing order of preference and in μm: [1.0-15.0], [2.0-12.0], [3.0-10.0].

As optimization purpose, at least one of the layers C,B,A of the film according to the invention, preferably the layer B and/or the layer A, includes fine particles different from the filler particles.

In this invention, these filler or fine particles are chosen among the inorganic and/or organic particles, preferably in the group comprising and more preferably in the group consisting in: titanium oxide, barium sulfate, silicon dioxide, aluminum oxide particles, zirconium oxide, tin oxide, calcium carbonate, calcium phosphate, zeolite, hydroxyapatite, aluminum silicate, wet-based and dry-based colloidal silica and alumina, polymer including styrene, silicone, polyacrylic acid, polymethacrylic acid, polyester, polymer including divinyl benzene and mixtures thereof.

As far as the fine particles are concerned, said fine particles include barium sulfate and/or titanium oxide particles in the following concentration ranges given herein in an increasing order of preference and in % w/w: [1-25]; [2-20]; [3-10].

As far as the filler particles are concerned, said filler particles include $SiO_2$ particles which have a median diameter D50 in the following ranges given herein in an increasing order of preference and in μm: [2.0-9.0], [3.0-8.5], [5.0-8.0].

It is a remarkable feature of the invention that the whole intrinsic viscosity (IV) of any layer is between 0.45 and 0.70 dl/g and, in particular, between 0.50 and 0.65.

Advantageously, the C-layer thickness is comprised within the following ranges given herein in an increasing order of preference and in μm: [0.3-6.0]; [0.5-5.0]; [0.7-4.0].

With respect to another mode of expression, the C-layer thickness is preferably comprised within the following ranges given herein in an increasing order of preference and in % of the overall film thickness: [0.5-40]; [0.8-25]; [1.0-20].

The film according to the invention can be also described through the following advantageous features:
a. the total light transmittance, TLT measured on the film is comprised between the following ranges given herein in an increasing order of preference and in %:[<90]; [<80]; [<70]; and/or
b. the Haze measured on the film is comprised between following ranges given herein in an increasing order of preference and in %: [>70]; [>80]; [>90].

The global crystallinity ratio of the film according to the invention, compared with a full crystallized PET measured by DSC, is preferably between the following ranges given herein in an increasing order of preference and in %:[<30]; [<25]. [<20].

In an improved embodiment with respect to the cohesion of the film, the surface of the C-layer opposite to the surface of the C-layer which is bonded to the B-layer, is treated by surface treatment to increase its surface tension within the following ranges given herein in an increasing order of preference and in mN/m: [>40]; [>45]; [>50].

The invention also pertains to a method for manufacturing a method for manufacturing a multilayer biaxially oriented polyester film according to the invention, said manufacturing method comprising:
i) the synthesis or the implementation of the polyesters, as above defined;
(ii) optional pre-drying of said polyesters;
(iii) heating the polyesters to melt them and make them malleable;
(iv) extruding the molten polyesters in a multilayer film, preferably through a flat die;
(v) rapid cooling (quenching) and the solidification of the multilayer film, preferably on a cooling drum;
(vi) the bi-axial stretching in the longitudinal and transverse directions of the multilayer film, at a given stretching temperature Ts;
(vii) heating the biaxially stretched film at a given heating temperature Th.

In this method, Ts and/or Th are more preferably selected in such a way that the endothermic peak temperature, Tmeta, is maintained under 240° C., more preferably, between 180 to 230° C., further more preferably, between 180 to 220° C., in order to control the hydrolysis resistance of said polyester film.

The polyester film can be of a simple structure or coextruded AB, ABA or ABC or even a more complex structure in multilayers (with the symbols A, B and C corresponding to layers of a different nature and/or of a different composition).

The invention also relates to a laminate metal/multilayer biaxially oriented polyester film comprising a metallic support preferably different from an aluminium foil when the film includes:
-C- at least one amorphous layer C comprising at least one copolyester PET-G- which the diol units include Ethylene Glycol -EG- units and CycloHexaneDiMethanol -CHDM- units;
-B- at least one polyester layer B comprising:
at least one copolyester PET-I which the diol units include Ethylene Glycol -EG- units and which the acid units include Terephtalic Acid -TA-units and Isophtalic Acid -IA-units; and
possibly at least one polyester PolyEthyleneTerephtalate PET;
-A- at least one layer A, identical or different from the layer B and comprising at least one polyester, preferably at least one polyester PolyEthyleneTerephtalate PET, and possibly at least one copolyester PET-I which the diol units include Ethylene Glycol -EG- units and which the acid units include Terephtalic Acid -TA-units and Isophtalic Acid -IA-units;
And wherein
i the concentration of the CHDM units in the layer C is comprised between 18 and 34 mol %, preferably between 22 and 33 mol %;
ii the concentration of the IA units in the layer B is greater than or equal to 9 mol %, preferably comprised between 9 and 36 mol %, and more preferably comprised between 11-18 mol %;
iii at least one of the layers C,BA, preferably the layer B and/or the layer A, incorporates filler particles which have a median diameter d50 in the following ranges given herein in an increasing order of preference and in μm: [2.0-12.0], [3.0-10], [5.0-9.0].

Said support is bonded to a film according to the invention.

It is interesting that the laminate of the invention has a decrease in tear resistance measured by Elmendorf tear resistance testing machine, which is comprised between the following ranges given herein in an increasing order of preference and in N/mm: [<5]; [<4]; [<3].

The laminate according to the invention is preferably characterized by a decrease of the feathering after lamination with metal substrates between the following ranges given herein in an increasing order of preference and in mm: [<1.0]; [<0.8]; [<0.7].

It is remarkable that the laminate according the invention is endowed by an increase of the sealing force which is within the following ranges given herein in an increasing order of preference and in N/38 mm: [>4]; [>5]; [>6].

This laminate can be used for the manufacture of container, for instance a food container, such as a can closed by a lid which can be perforated for the opening by a pull tab or a stay-on tab.

Thus, the invention also concerns a method for manufacturing a laminate according to the invention, wherein the multilayer biaxially oriented polyester film is laminated with a metallic support different from an aluminium foil, at a temperature T1 comprised between 100 and 300° C., said lamination preferably comprising an induction heating step, an IR annealing step and a cooling step, preferably by water spraying.

And the invention encompasses moreover, a container made from the above defined laminate wherein the metallic support is the external wall of said container.

DETAILED DESCRIPTION OF THE INVENTION

Note that in this text, any "singular" can be interpreted as a "plural" and vice versa.

The multilayer polyester film according to the invention is suitable for various applications such as packaging applications for which at least one of the aforementioned properties (a) to (g) is required.

Multilayer Polyester Film

For example, the multilayer polyester film according to the invention is a three-layer polyester film C/B/A.

The biaxially oriented polyester films which can compose these layers are, for example:
  either constituted by polyethylene terephthalate,
  or they are mixtures, or not, of polyethylene terephthalate copolyesters containing cyclohexyl dimethylol units instead of the ethylene units (see U.S. Pat. No. 4,041,206 or EP-A-0408042),
  or are composed of mixtures, or not, of polyethylene terephthalate copolyesters with a polyester portion having isophthalate units [PET-I] (see patent EP-B-0515096),
  or are composed of mixtures, or not, of polyethylene terephthalate copolyesters with a polyester portion having sebacate units [PET-S],
  or are composed of mixtures, or not, of polyethylene terephthalate copolyesters with a polyester portion having adipate units [PET-A],
  or are constituted by several layers of polyesters of different chemical natures, as described previously, obtained by coextrusion.

Specific examples of aromatic polyesters (PE1, PE2, . . . ) are in particular polyethylene terephthalate (PET), polyethylene isophthalate, polybutylene terephthalate, poly-(dimethyl-1,4-cyclohexyleneterephthalate) and polyethylene-2,6-naphthalene-dicarboxylate. The aromatic polyester can be a copolymer of these polymers or a blend of these polymers with a small quantity of other resins, for example and without being limitative, polybutylene terephthalate (PBT).

Suitable biaxial oriented film may be prepared, for example, by stretching a cast polyester film to 2.5 to 5 times its original length in the longitudinal direction and to 2.5 to 5 times its original width in the transverse direction at a temperature higher than the glass transition temperature but lower than the crystallization temperature, and then, heat-setting the stretched film at a temperature of 180 to 240° C. More particularly, a biaxially oriented polyester film, which has been stretched about 3.3 times its original length in the longitudinal direction and about 3.3 times its original width in the transverse direction and, then, heat-set at a temperature of 180 to 200° C. under tension, is optimum in view of its ability to be laminated to a metal sheet and subsequent formability.

First Adhesive/Amorphous Layer C:

The "first layer" of the biaxial oriented film is defined as the layer of the film that is in direct contact with the metal substrate. This layer C may be alternatively referred to as the "contact layer", "bonding layer", "adhesion layer," or "adhesive layer."

☞ PET-G

The copolyester PET-G-comprises, on the one hand, diol units which are Ethylene Glycol -EG- units and Cyclo-HexaneDiMethanol -CHDM- units, and, on the other hand, acid units which are Terephtalic Acid -TA- units.

Layer C includes at least 55% wt of one or several amorphous PET-G copolyesters.

The molar % of -CHDM- units is in the range of 10-45 mol %, preferably 12-40 mol %. Such range is optimized regarding sealing and adhesion strength with metal. PET-G makes it possible to start the sealing for instance from 120-140° C. with better pre-adhesion.

☞ PET

Layer C contains also at least one polyethylene terephthalate homopolymer.

The % by weight of PET-G and PET in C are respectively, for example, between 60 and 90% wt, and between 40 and 10% wt.

The intrinsic viscosity (IV) of layer C is e.g. between 0.65 and 0.80 dl/g.

The C-layer thickness is e.g. between 0.7-3.0 μm and represents e.g 18 to 30% of the multilayer polyester film thickness.

Layer C can also contain between 0.1 and 5% wt of filler particles which D50 is comprised between 1 and 5 μm.

Furthermore, from the point of view of adhesion, the centre line average roughness Ra of C layer is preferably in the range 0.005 to 0.1 μm, more preferably 0.008 to 0.05 μm. Moreover, high speed process ability can be enhanced by selecting a ratio of maximum roughness Rt, that is to say the ratio Rt/Ra, between 1 and 100, and preferably between 5 and 50.

Second Crystallizable Layer B:

The layer B can be composed of one or several copolyesters CP1, CP3, . . . CPn.

CP1 can be a PET-X, for instance: PET-I and/or PET-S and/or PET-A, and/or PET-DA, and/or PET-NA.

CP3 can be a PBT-X, for instance: PBT-I and/or PBT-S and/or PBT-A, and/or PBT-DA, and/or PBT-NA.

In a Preferred Embodiment:

☞ CP1 can be PZT-I Wherein Z Corresponds to Ethylene and CP3 can be PZT-I Wherein Z Corresponds to Butylene The copolyester PZT-I-comprises, on the one hand, diol units which are Ethylene Glycol -EG- units, and, on the other hand, acid units which are Terephtalic Acid -TA- units and isophthalic Acid -IA- units.

Layer B can include at least 50% wt of one or several PZT-I copolyesters.

The molar % of -IA- units is in the range of 9-36 mol %, preferably 11-18 mol %.

☞ CP1 can be PZT-S Wherein Z Corresponds to Ethylene and CP3 can be PZT-S Wherein Z Corresponds to Butylene The copolyester PZT-S- comprises, on the one hand, diol units which are Ethylene Glycol -EG- units, and, on the other hand, acid units which are Terephtalic Acid -TA- units and sebacic Acid -SA- units.

Layer B can include at least 50% wt of one or several PZT-S copolyesters.

The molar % of -SA- units is in the range of 9-36 mol %, preferably 11-18 mol %.

☞ CP1 can be PZT-A Wherein Z Corresponds to Ethylene and CP3 can be PZT-A Wherein Z Corresponds to Butylene The copolyester PZT-A- comprises, on the one hand, diol units which are Ethylene Glycol -EG- units, and, on the other hand, acid units which are Terephtalic Acid -TA- units and Adipic Acid -AA- units.

Layer B can include at least 50% wt of one or several PZT-A copolyesters.

The molar % of -AA- units is in the range of 9-36 mol %, preferably 11-18 mol %.

☞ PET

Layer B can also contain at least one polyester PE1, preferably a homopolymer, and more preferably a polyethylene terephthalate, and optionally another polyester PE2 different from PE1. PE2 is for instance a polybutylene terephthalate.

In a first possibility, the % by weight of PET-X and PET in B are respectively, for example, between 80 and 100% wt, and between 20 and 0% wt.

In a second possibility, the % by weight of PET-X, PBT-X and PET in B are respectively, for example, between 20 and 80% wt, between 20 and 70% wt, and between 20 and 0% wt.

Layer B also contains between 0.01 and 10% wt of coarse filler particles which D50 is comprised between 2.5 and 10 µm, and optionally up to 15% wt of fine particles which D50 is comprised between 0.01 and 5 µm.

The coarse filler particles are notably useful in the enhancing of a non-stick property, in the handling and in the processability of the manufacture of the layer B, of the multi-layered film, and of the laminate.

And additionally, the coarse filler particles have a good impact of the feathering performances of the laminate.

The fine particles have a role to enhance masking property after pasteurization and acid media resistance test, and to obtain also good esthetic properties.

The intrinsic viscosity (IV) of layer B is e.g. between 0.50 and 0.70 dl/g.

The B-layer thickness is e.g. between 1.0-10.0 µm and represents e.g 50 to 90% of the multilayer polyester film thickness.

Third Layer A:

This layer A is preferably different from layer B and C. But in variant, layer A can be the same as layer B.

☞ Polyester PE2 Preferably a PET

The preferred polyester of said layer is a polyethylene terephthalate homopolymer.

Layer A can also contain at least one polyester PE3 different from PE2, preferably a homopolymer, and more preferably a polyethylene terephthalate.

☞ the Layer A can Also Include One or Several Copolyesters CP2, CP3, . . . CPn.

CP2 can be a PET-X, for instance: PET-I and/or PET-S and/or PET-A, and/or PET-DA, and/or PET-NA.

CP3 can be a PBT-X, for instance: PBT-I and/or PBT-S and/or PBT-A, and/or PBT-DA, and/or PBT-NA.

In a Preferred Embodiment:

☞ CP2 can be PZT-I Wherein Z Corresponds to Ethylene and CP3 can be PZT-I Wherein Z Corresponds to Butylene The copolyester PZT-I-comprises, on the one hand, diol units which are Ethylene Glycol -EG- units, and, on the other hand, acid units which are Terephtalic Acid -TA- units and isophthalic Acid -IA- units.

Layer A can include at least 50% wt of one or several PZT-I copolyesters.

The molar % of -IA- units is in the range of 9-36 mol %, preferably 11-18 mol %.

☞ CP2 can be PZT-S Wherein Z Corresponds to Ethylene and CP3 can be PZT-S Wherein Z Corresponds to Butylene The copolyester PZT-S- comprises, on the one hand, diol units which are Ethylene Glycol -EG- units, and, on the other hand, acid units which are Terephtalic Acid -TA- units and sebacic Acid -SA- units.

Layer A can include at least 50% wt of one or several PZT-S copolyesters.

The molar % of -SA- units is in the range of 9-36 mol %, preferably 11-18 mol %.

☞ CP2 can be PZT-A Wherein Z Corresponds to Ethylene and CP3 can be PZT-A Wherein Z Corresponds to Butylene The copolyester PZT-A- comprises, on the one hand, diol units which are Ethylene Glycol -EG- units, and, on the other hand, acid units which are Terephtalic Acid -TA- units and Adipic Acid -AA- units.

Layer A can include at least 50% wt of one or several PZT-A copolyesters.

The molar % of -AA- units is in the range of 9-36 mol %, preferably 11-18 mol %. In a first possibility, the % by weight of PET and PET-X in A are respectively, for example, between 90 and 100% wt, and between 10 and 0% wt.

In a second possibility, the % by weight of PET, PET-X and PBT-X in A are respectively, for example, between 0 and 30% wt, between 30 and 80% wt, and between 50 and 0% wt.

Layer A also contains between 1 and 15% wt of coarse filler particles which D50 is comprised between 2.5 and 10 µm, and optionally up to 15% wt of fine particles which D50 is comprised between 0.01 and 5 µm.

The intrinsic viscosity (IV) of layer A is e.g. between 0.50 and 0.70 dl/g.

The A-layer thickness is e.g. between 0.5-5.0 µm and represents e.g 5 to 20% of the multilayer polyester film thickness.

Structure:

The film structure of the biaxial-oriented polyester film for fabrication of the present invention can be at least two layers C/B, three layers C/B/A or C/B/B, or more than three layers, and the laminate thickness ratio can be below described range, but two layers C/B and three layers C/B/A are preferred. Present invitation film having a total thickness comprised within the following ranges given herein in an increasing order of preference and in µm: [5-50]; [7-30]; [9-20]. The thickness of the core layer B, the thickness of the layer C and outer layer A is the proportion of these two or three thicknesses may be varied depending upon the intended end use. Usually, the total thickness of the biaxial oriented film is in the range of from about 5 to 50 microns.

In the case where the biaxial-oriented polyester film is used to make a laminate with a metal foil(s) to manufacture a container formed by drawing processing, the total thickness of the two/three layers are preferably in the range of from about 7 to 30 microns, particularly about 9 to 20 microns in view of the formability. If the laminate made from said film is intended for use in applications where a high corrosion resistance is required, the thickness of the core layer B may exceed about 30 microns, but in most applications is in the range of from about 7 to 30 microns, preferably from about 9 to 20 microns. The thickness of the adhesive layer C varies mainly depending upon the surface roughness of the metal sheet used for the laminate's manufacture. However, when the metal sheet is of a relatively smooth surface, the thickness of the adhesive layer C may be at least 0.3-6 microns for the desired adhesion, preferably from 0.5 to 5.0 micron meter more preferably from 0.7 to 4 micron meter.

The thickness of the adhesive layer C may be preferably over 1.0 micron for the desired adaptability to retorting treatment, and more preferably at least about 2.0 microns. Thus, the ratio in thickness of the layer C to the all the layers may be in the % range of [0.5-40]; [0.8-25]; [1.0-20].

The level of co-polyester [preferably (PET-G)] within the layer C is preferably greater than or equal to 0.5%, to improve adhesion strength and preferably lower than or equal to 40%, to increase feathering performance in the applications consisting in the manufacture of containers made of the laminate metal/multi-layered polyester film.

Additives

Moreover, if necessary, the multi-layer, biaxially oriented film can further contain at least one other additive, preferably selected from the following group: radical scavenger, flame retardant, dye, antistatic agent, antioxidant, organic lubricant, an anti-UV additive or fireproofing additive, a catalyst or any other similar additive.

The anti-UV additive can be selected from several examples of known products such as those described in the work "*Additives for plastics on book, John Murphy, 2$^{nd}$ Edition 2001, Elsevier Advanced Technology*". As examples of anti-UV additives, there may be mentioned those of the family of antioxidants or absorbers such as the benzophenones, the benzotriazoles, the benzoxazinones and the triazines; and those of the family of "*Hindered amine light stabilizers*" (HALS), alone or in combination with antioxidants. These anti-UV additives serve for countering the effects of UV and oxygen on polyester films.

Surface Treatment

The multi-layered, biaxially oriented films of the invention can have a surface treatment on at least one side, in order to improve adhesion, antistatic performance, slip and winding performance. The surface treatment can be a physical surface treatment (for example UV, corona treatment under ambient air or in the presence of gases, vacuum evaporation, plasma treatment or plasma-assisted vapour phase chemical deposit), or a chemical surface treatment (for example coating of acrylic, copolyester, polyester or polyurethane based formulations).

The chemical surface treatment can be obtained by coextrusion, extrusion coating, in-line coating done prior to transverse stretching during the film making process or off-line coating.

Manufacture of the Multilayer Polyester Film

Multi-layer, biaxially oriented films are preferably prepared in a two-stage process. In a typical commercial process these stages are conducted in tandem and are usually performed in a continuous manner. For the sake of clarity, multi-layered films comprised of three layers will be discussed in more detail, though the principles may be utilized to manufacture multi-layer films having 4, 5, or more layers.

The two stages of the film formation process include (1) the production of a multi-layer cast film and (2) subsequently stretching the cast film according to the processes and ratios previously discussed. This is usually accomplished by heating the multi-layer cast film to an appropriate temperature, and then biaxially stretching the film to achieve the desired film length, width and thickness.

For example, if a three-layer cast film were to be comprised of three different materials (one for each distinct layer) it would be typical to use three extruders, i.e., a dedicated extruder for the feeding of each differing material. A multi-layer die, which is capable of receiving and casting the different materials as a multi-layered molten veil, would be utilized. The thicknesses of the various layers of the veil may be controlled by the rate at which each molten material is fed from the extruder to the die. For example if the melt feed rate of the middle layer extruder is twice that of both of the other extruders one would prepare a film whose layer proportions are, for instance, approximately 12%/67%/21%. The overall thickness of the cast film may be controlled by the overall line speed at which the film is being pulled in conjunction with the total feed rate of molten polymer.

Most materials used for extrusion and film formation are supplied and/or produced in pellet or granulate form. These pellets are typically a few millimeters in length. Each of the materials is metered through the back end of the extruder via a hopper. A gravimetric hopper metering system may be used to control the weight/time feed rates of materials. In typical cast film formation, each hopper of each extruder is fed with only one granulates. Therefore a typical three-layer cast film, which uses a different material for each layer, would typically be made from a total of three different pellets. However, as discussed herein, there are situations where a layer is itself comprised of a blend of more than one material. In such situations, there are at least two practical means of achieving the blend.

The first method would be to simply prepare a blend of the materials (i.e., a simple physical blend of the materials to be mixed) and feeding this cold blend directly to the extruder. When using this approach, one is relying on the extruder to adequately mix and homogenize the cold blend and feed the mixture uniformly to the feeding block of the film die. This method requires an extruder that is able to both meter the materials to the film and uniformly mix the cold blend. Care should be taken when using this approach as many commercial film extruders are not particularly suited for mixing cold blends and usually results in films with very poor homogeneity. A more preferred means of preparing a layer comprised of a blend of more than one material is through "compounding." In this process, the material used in the layer are again cold blended at the appropriate ratio and are fed into the hopper of an extruder used for material mixing, blending or compounding.

These machines can contain a variety of screw configurations that are designed to achieve material mixing and dispersion. Suitable mixing extruders can be either single- or twin-screw extruders, and can also provide an effective mixing of components while minimizing any overworking of the mixture, which could result in degradation. Once the material blend is passed through the compounding extruder, a single, fully mixed pellet is obtained. This single pellet can then be used in the film production, as no further mixing within the film making extruder is required.

The biaxially-oriented polyester film for fabrication of the present invention can be favorably employed for fabrication processes, for example it is ideal for food package applications by lamination to aluminum sheet, and then processing. In particular, it can be favorably used as film for laminating to aluminum sheet and fabricating, in order to preserve foods containing proteins (for example foods or drinks)

Below, practical examples of the present invention are described but these examples are not to restrict the interpretation of the invention in any way.

Metal/Polyester Laminates

This invention encompasses laminates, in particular laminates for the manufacture of packagings.

The laminate according to the invention corresponds to an assemblage of different layers each having their own physical existence. It is obtained by technologies such as pasting, laminating, extrusion coating, complexing, etc.

For illustration purpose, the enclosed FIG. 1 is a section scheme of an example of a laminate aluminium/multilayer according to the invention.

EXAMPLES

-I- Measurements
Intrinsic Viscosity

A sample solution is obtained by dissolution of a given quantity of the sample (polymer or film) at least at 120° C. for 30 min in 100 mL of a solvent mixture of 1,2-dichlorobenzene/phenol 50/50. After cooling down, the elution time of the sample solution is measured with an Ubbelohde viscosimeter. The intrinsic viscosity value IV of the sample is calculated is calculated according to the standard ISO 1628/5 using the following correlations.

The viscosity of the pure solvent mixture $\eta 0$ is compared to the viscosity of the sample solution $\eta$. The relative viscosity $\eta r$ is given by: $\eta r = \eta/\eta 0 = t*\rho/t0*\rho 0$ with: t0 and $\rho 0$ are the elution time and density of the solvent mixture; t and $\rho$ are the elution time and density of the sample solution.

Since $\rho \sim \rho 0$ in this study, the following equation for specific viscosity lisp is therefore obtained: $\eta \text{ sp} = \eta r - 1 = (t-t0)/t0$. The correlation between lisp and intrinsic viscosity IV is given by: $(\eta \text{ sp}/C) = IV + k*IV^2*C$ with: $(\eta \text{ sp}/C)$: viscosity number. C: concentration of polymer in the solution; K: constant. The intrinsic viscosity IV can be determined experimentally by measuring the viscosity number ($\eta$ sp/C) as function of concentration C. The intrinsic viscosity IV corresponds to the value of ($\eta$ sp/C) when the concentration approaches zero (infinite dilution).

Median Diameter of Particles $d_{50}$

The median diameter of particles $d_{50}$ (expressed in μm) was measured with a laser on a masterSizer from Malvern using a standard method. For the tests, the specimens are placed in a cell with phosphated water (1 g/l of $Na_2P_2O_7$-$10H_2O$). The cell is then placed in the test device. The test procedure is automatic and includes the mathematical determination of the value $d_{50}$. The $d_{50}$ is determined by the cumulative distribution curve of the size of the particles. The point of intersection of the ordinate 50% with the distribution curve directly gives the value $d_{50}$ on the axis of the abscissa.

Particle Concentration [Laser Diffraction Methods]

Advances in sophisticated data processing and automation have allowed this to become the dominant method used in industrial PSD determination. Laser diffraction measures particle size distributions by measuring the angular variation in intensity of light scattered as a laser beam passes through a dispersed particulate sample. Large particles scatter light at small angles relative to the laser beam and small particles scatter light at large angles, as illustrated below. The angular scattering intensity data is then analyzed to calculate the size of the particles responsible for creating the scattering pattern, using the Mie theory of light scattering. The particle size is reported as a volume equivalent sphere diameter.

A sheet was used as a sample, and the content of particle element being characteristic of each particle was calculated with fluorescent-X-ray elemental analysis apparatus (MESA-500W type, manufactured by HORIBA, Ltd.). For example, the titanium dioxide content was converted from the amount of titanium element.

Optical properties [Haze, TLT](%)

Haze and TLT was measured haze meter based on ASTM D 1003.

Melting Temperature (Tm)

The melting point was measured using a differential scanning calorimeter DSC2 (made by Perkin Elmer). 10 mg of sample was melted and held for 5 minutes at 280 DEG C. under a current of nitrogen, and then rapidly cooled using liquid nitrogen. The sample obtained was heated at a rate of 10 DEG C./minute and the endotherm peak temperature due to crystal melting was taken as the melting point (Tm).

Crystallinity Ratio (%)

The crystallinity ratio was measured using a differential scanning calorimeter DSC2 (made by Perkin Elmer). 10 mg of sample was melted and held for 5 minutes at 280 DEG C. under a current of nitrogen, and then rapidly cooled using liquid nitrogen. The sample obtained was heated at a rate of 10 DEG C./minute and the endotherm peak temperature due to crystal melting was taken as the melting energy [J/g] (delta Hm). And then calculated crystallinity ratio is compared with full crystallinity PET (140.1 J/g). Crystallinity ratio (%)=melting energy delta Hm/theoretical full crystallinity PET (140.1 J/g)

Polyester Unit Evaluation

The sample polyester was dissolved in a deuteration solvent (such as CF3 COOD) capable of dissolving the sample and its chemical shift was determined by 1H-NMR, from which the respective ester unit species and their ratios were calculated. In order to evaluate the polyester unit of each layer, the layers other than the one to be evaluated were removed by plasma treatment, isolating the desired layer.

Layer Thickness

The whole thickness was measured in accordance with thickness gauge and pretreatment was carried out to cut the cross section of the co-extruded layer in a thickness direction with a microtome. Thereafter, the thickness cross section was image-captured at a magnification (×1000) that could take an overview image of the thickness cross section with a field emission scanning electron microscope (FE-SEM) S-800, manufactured by Hitachi, Ltd. and the thickness of the cross section photograph was measured. B Layer or A layer containing pigment or particles can be image-captured as a white layer.

Sealing Property

Sealing force was measured by hot tuck equipment with following sealing condition based on ASTM F1921; Sealing temperature: 140 DEG C. for hot top and bottom jaws. Sealing time: 1 second. Sealing pressure: 0.5 N/mm2. Sample width: 38 mm Tear Resistance [N/Mm]

Before measure the tear resistance, sample specimens are treated 230 DEG C.*30 second in oven to simulate the metal lamination. Then tear resistance was measured by Elmendorf tear testing machine with 980 mN load based on ASTM D 1922.

Feathering Evaluation [Mm]

Feathering test is described as follows. To test feathering, a "film laminated specimens (10 cm*21 cm)" are cut from three desired location from on the A4 sheet. Specimens are tested before and after pasteurization. The samples are allowed to cool down after pasteurization and cut the specimen two different locations from the back and wound up with a pair of pliers from the back. After wounding the laminated sheet, any film that extends from the edge on the test panel is measured. The distance of the greatest penetration (feathering) is reported in mms. Film laminations for easy-open food or beverage can ends preferably show feathering below 1.0 mm, more preferably below 0.8 mm, most preferably below 0.7 mm. Certain preferred films of the invention, exhibited a feathering of 0.2-0.6 mm when tested as described above.

EXAMPLES

The tables 1-4 infra give the compositions and the structure of the laminates metal/multi-layered polyester film of the examples (tables 1&2) according to the invention and of the comparative examples (tables 3&4), as well as the results of the assessment of these laminates.

Examples 1-6, 8, 12-13

Layer A

Chips of polyester A are made of polyethylene terephthalate (antimony trioxide catalyst, intrinsic viscosity 0.65, Silica concentration 3 wt % & D50: 5.2 micron). Said PET is obtained by heat treating an ethylene glycol slurry containing flocculated silica particles for 2 hours at 190° C. and adding the slurry following the end of the esterification reaction, and then carrying out the polycondensation reaction. After measuring out a specific quantity of these chips, it was dried under vacuum for 3 hours at 180° C. and supplied to a single screw extruder.

Layer B

Chips of polyester B are made of polyethylene isophthalate 12 mol % (antimony trioxide catalyst, intrinsic viscosity 0.65, Silica concentration 0.05 wt % & D50 5.2 micron). Said PET-I is obtained by heat treating an ethylene glycol slurry containing flocculated silica particles for 2 hours at 190° C. and adding the slurry following the end of the esterification reaction, and then carrying out the polycondensation reaction. After measuring out a specific quantity of this chip, it was supplied to a twin screw extruder without drying.

Layer C

Chips of PET-G are chips of PET-G EASTAR® 6763 which is co-polyester resin supplied by the Eastman Chemical Company. This resin contains 33-mole % CHDM and 67-mole % ethylene glycol ("EG"), based on the total moles of the diol blend. These chips of PET-G EASTAR® 6763 are then diluted down to 28 mol % by PET.

Chips A & B are dried under vacuum for 3 hours at 180° C. and supplied to a each single screw extruder I & II, Chips C are dried under vacuum for 72 hours at 65° C. and supplied to a single screw extruder III.

The films obtained from these chips are discharged from a normal die and cooled and solidified on a mirror-surface cooled drum while performing electrostatic pinning (7 kv). An undrawn film containing PET-G (drum rotation rate 40. m/min) is produced. This undrawn film is drawn by a factor of 3.2 in the lengthwise direction at a temperature of 105° C. and then cooled to 40° C. After that, the film is pre-heated for 5 seconds at a temperature of 115° C. and then drawn by a factor of 3.6 in the widthwise direction at the same temperature, following which there is a 5 seconds 5% relaxation heat treatment at 190° C., and the biaxially-oriented polyester film of thickness 12 μm of the example 1, is produced.

After lamination with an aluminium foil, the so got laminate M/C/B/A is shown in Table 1, along with its advantageous properties.

Examples 7, 9

Layer C includes a copolyester PET-G+PET-I which is obtained as described hereinafter: Chips of PET-G are chips of PET-G EASTAR® 6763 which is co-polyester resin supplied by the Eastman Chemical Company. This resin contains 33-mole % CHDM and 67-mole % ethylene glycol ("EG"), based on the total moles of the diol blend. These chips of PET-G EASTAR® 6763 are then diluted down to 28 & 16.5 mol % by PET & PET-I. The chip of PET-I which are same method as example 1.

Examples 10-11

The film C/B/A is manufactured as described for examples 1-6, 8, except that layer A is identical to layer B.

Example 12

Layer B includes a copolyester PET-I and a PBT which is obtained as described herein after: The chip of PET-I which are same method as example 1.

Chips of PBT are made of polybutylene terephtalate (antimony trioxide catalyst, intrinsic viscosity 0.65, Silica concentration 0.05 wt % & D50 5.2 micron). Examples 13

Layer B includes a copolyester PET-I and a PBT-I which is obtained as described herein after: The chip of PET-I which are same method as example 1.

Chips of PBT-I are made of polybutylene terephtalate 65 mol % & isophthalate 35 mol % (antimony trioxide catalyst, intrinsic viscosity 0.65, Silica concentration 0.05 wt % & D50 5.2 micron).

Examples 14-19, 21

The film C/B/A is manufactured as described for examples 1-9, 12-13 except that, in the layer B, the copolyester is a PET-S produced from polyethylene sebacic acid (antimony trioxide catalyst, intrinsic viscosity 0.57, Silica concentration 0.05 wt %, D50; 5.2 micron) to confirm the effect of low melting polymer in B and/A layer. And surfaces are treated by corona treated equipment with several conditions. Evaluation results are shown in Table 2

Examples 20, 22

Layer C includes a copolyester PET-G & PET-I which is obtained as described herein after: Chips of PET-G are chips of PET-G EASTAR® 6763 which is co-polyester resin supplied by the Eastman Chemical Company. This resin contains 33-mole % CHDM and 67-mole % ethylene glycol ("EG"), based on the total moles of the diol blend. These chips of PET-G EASTAR® 6763 are then diluted down to 28 & 16.5 mol % by PET & PET-I. The chip of PET-I which are same method as example 1

Examples 23-24

The film C/B/A is manufactured as described for examples 14-19, 21, except that layer A is identical to layer B.

Examples 25

Layer B includes a copolyester PET-I and a PBT which is obtained as described herein after: The chip of PET-I which are same method as example 1.

Chips of PBT are made of polybutylene terephtalate (antimony trioxide catalyst, intrinsic viscosity 0.65, Silica concentration 0.05 wt % & D50 5.2 micron).

Examples 26

Layer B includes a copolyester PET-I and a PBT-I which is obtained as described herein after: The chip of PET-I which are same method as example 1.

Chips of PBT-I are made of polybutylene terephtalate 65 mol % & isophthalate 35 mol % (antimony trioxide catalyst, intrinsic viscosity 0.65, Silica concentration 0.05 wt % & D50 5.2 micron).

Comparative Examples 1 to 26

Films were obtained by carrying out film production in the same way as in examples 1-26 with the several types of polyester and the particles changed to those shown in Tables 3 and 4.

It is clear from Tables 1, 2 and Tables 3, 4 that the films from comparative examples 1 to 26 were inferior in their properties especially, feathering performance and sealing force.

In addition to that, the sealing force at 140 DEG C. of the laminates M/C/B/A couldn't be measured in the comparative examples 9-13, 22-26.

In the tables, the codes used had the following meanings.

PET: polyethylene terephthalate

PET/I: polyethylene terephthalate with copolymerized isophthalic acid

PET/S: polyethylene terephthalate with copolymerized sebacic acid

PET/N: polyethylene terephthalate with copolymerized Naphthalene DiCarboxylic acid (NDC)

PET/G: polyethylene terephthalate with copolymerized [4-(hydroxymethyl)cyclohexyl]methanol PBT: polybutylene terephthalate PBT/I: polybutylene terephthalate with copolymerized isophthalic acid

TABLE 1

| | Items | | Examples 1 | 2 | 3 | 4 | 5 | 6 | 7 | 8 | 9 | 10 | 11 | 12 | 13 |
|---|---|---|---|---|---|---|---|---|---|---|---|---|---|---|---|
| Polyester layer A | Formulation | Polymer component | PET | PET | PET | PET | PET | PET | PET | PET | PET | Same as Layer B | Same as Layer B | PET | PET |
| | | Co-polymer [mol %] | EG | EG | EG | EG | EG | EG | EG | EG | EG 17 | | | EG | EG |
| | | IV | 0.65 | 0.65 | 0.65 | 0.65 | 0.65 | 0.65 | 0.65 | 0.65 | 0.65 | | | 0.65 | 0.65 |
| | Particles | kinds | Silica | Silica | Silica | Silica | Silica | Silica | Silica | Silica | Silica | | | Silica | Silica |
| | | D50 | 5.2 | 5.5 | 6.2 | 6.5 | 6.1 | 7 | 7.5 | 8.5 | 9 | | | 7.9 | 7.9 |
| | | Concentration (%) | 3 | 3 | 3 | 3 | 3 | 3 | 3 | 3 | 3 | | | 3 | 3 |
| | Melting temperature [° C.] | | 255 | 255 | 255 | 255 | 255 | 255 | 255 | 255 | 255 | | | 255 | 255 |
| | Thickness (um) | | 1.5 | 1.5 | 1.5 | 1.5 | 1.5 | 1.5 | 1.5 | 1.5 | 1.5 | | | 1.5 | 1.5 |
| | Ratio A layer/Total thickness (%) | | 12.5 | 12.5 | 15 | 12.5 | 12.5 | 12.5 | 12.5 | 12.5 | 12.5 | | | 12.5 | 12.5 |
| Polyester layer B | Formulation | Polymer component | PET/I | PET/I | PET/I | PET/I | PET/I | PET/I | PET/I | PET/I | PET/I | PET/I | PET/I | PET/I | PET/I |
| | | Co-polymer [mol %] | IA 12 | IA 12 | IA 17 | IA 17 | IA 12 | IA 12 | IA 12 | IA 15 | IA 15 | IA 12 | IA 17.5 | IA 15 | IA 15 |
| | | IV | 0.65 | 0.65 | 0.65 | 0.65 | 0.65 | 0.65 | 0.65 | 0.65 | 0.65 | 0.63 | 0.63 | 0.65 | 0.65 |
| | Particles.1 | kinds | Silica | Silica | Silica | Silica | Silica | Silica | Silica | Silica | Silica | Silica | Silica | Silica | Silica |
| | | D50 | 5.2 | 5.5 | 6.2 | 6.5 | 3 | 3.2 | 6.5 | 8.5 | 3.5 | 2.5 | 3.5 | 3.5 | 3.5 |
| | | Concentration (%) | 0.05 | 0.05 | 0.05 | 0.05 | 2.11 | 2.11 | 0.05 | 0.15 | 2.64 | 0.05 | 6 | 0.05 | 0.05 |
| | Particles 2 | kinds | TiO2 | TiO2 | TiO2 | TiO2 | — | — | TiO2 | TiO2 | — | BaSO4 | BaSO4 | TiO2 | TiO2 |
| | | D50 | 0.3 | 0.3 | 0.3 | 0.3 | — | — | 0.3 | 0.3 | — | 0.7 | 0.7 | 0.3 | 0.3 |
| | | Concentration (%) | 6 | 6 | 6 | 6 | — | — | 4 | 12 | — | 3 | 3 | 6 | 6 |
| | Additional material | | — | — | — | — | — | Silica 3.2 0.99 | IA (4.5 mol %) | — | IA (15 mol %) | — | — | PBT (50 wt %) | PBT/I (25 wt %) |
| | Melting temperature [° C.] | | 241 | 241 | 233 | 234 | 244 | 241 | 241 | 233 | 237 | 244 | 210 | 219/225 | 190/225 |
| | Ratio B layer/Total thickness (%) | | 8 | 8 | 6 | 8 | 8 | 8 | 8 | 8 | 8 | 8 | 8 | 8 | 8 |
| Polyester layer C | Formulation | Polymer component | PET/G | PET/G | PET/G | PET/G | PET/G | PET/G | PET/G | PET/G | PET/G | PET/G | PET/G | PET/G | PET/G |
| | | Co-polymer [mol %] | CHDM 28 | CHDM 28 | CHDM 28 | CHDM 28 | CHDM 28 | CHDM 28 | CHDM 28 | CHDM 28 | CHDM 16.5 | CHDM 28 | CHDM 28 | CHDM 33 | CHDM 33 |
| | | IV | 0.75 | 0.75 | 0.75 | 0.75 | 0.75 | 0.75 | 0.75 | 0.75 | 0.69 | 0.75 | 0.75 | 0.78 | 0.78 |
| | Particles | kinds | — | — | — | — | — | — | — | — | — | — | — | — | — |
| | | D50 | — | — | — | — | — | — | — | — | — | — | — | — | — |
| | | Concentration (%) | — | — | — | — | — | — | — | — | — | — | — | — | — |
| | Additional material (mol %) | | — | — | — | — | — | — | — | — | — | — | — | — | — |
| | Melting temperature [° C.] | | — | — | — | — | — | — | — | — | — | — | — | — | — |
| | Ratio C layer/Total thickness (%) | | 66.7 | 66.7 | 60 | 66.7 | 66.7 | 66.7 | 66.7 | 66.7 | 66.7 | 66.7 | 66.7 | 66.7 | 66.7 |
| Film | Total thickness (um) | | 2.5 | 2.5 | 2.5 | 2.5 | 2.5 | 2.5 | 2.5 | 2.5 | 2.5 | 2.5 | 2.5 | 2.5 | 2.5 |
| | Surface tention (mN/m) | | 20.8 | 20.8 | 25 | 20.8 | 20.8 | 20.8 | 20.8 | 20.8 | 20.8 | 20.8 | 20.8 | 20.8 | 20.8 |
| | IV | | 12 | 10 | 10 | 12 | 12 | 12 | 12 | 12 | 12 | 12 | 12 | 12 | 12 |
| | | | 42 | 42 | 42 | 42 | 42 | 42 | 42 | 42 | 42 | 42 | 42 | 42 | 42 |
| | Crystallinity ratio(%) | | 0.67 | 0.65 | 0.64 | 0.63 | 0.64 | 0.63 | 0.65 | 0.62 | 0.64 | 0.61 | 0.61 | 0.64 | 0.64 |
| | TLT (%) | | 22 | 23 | 19 | 18 | 23 | 22 | 22 | 21 | 21 | 13 | 13 | 22 | 21 |
| | Haze (%) | | 68.4 | 71.8 | 70.7 | 68 | 85.6 | 86.7 | 78.3 | 58.6 | 85 | 71 | 69.5 | 67.9 | 69.5 |
| | | | 71.8 | 83.8 | 86.1 | 90.9 | 69.3 | 67.8 | 58.9 | 99.5 | 75.4 | 84.5 | 85.2 | 91.4 | 92.1 |
| Lamination result | Sealing Temperature - T° C. | | 140 | 140 | 140 | 140 | 140 | 140 | 140 | 140 | 140 | 140 | 140 | 140 | 140 |
| | Sealing force (N/38 mm) | | 5.4 | 5.0 | 7.9 | 8.9 | 5.2 | 4.7 | 5.7 | 8.9 | 8.8 | 6.7 | 7.5 | 8.5 | 8.3 |
| | Max. feathering [mm] | | 0.2 | 0.6 | 0.2 | 0.4 | 0.3 | 0.4 | 0.4 | 0.3 | 0.3 | 0.2 | 0.3 | 0.6 | 0.6 |
| | Tear resistance after heat treatment 230° C. * 15 s (N/mm) | | 3.2 | 2.4 | 2.4 | 2.4 | 2.7 | 2.8 | 2.5 | 1.8 | 2.1 | 3.1 | 3.2 | 1.2 | 1.5 |

TABLE 2

| | Items | | Examples 14 | 15 | 16 | 17 | 18 | 19 | 20 | 21 | 22 | 23 | 24 | 25 | 26 |
|---|---|---|---|---|---|---|---|---|---|---|---|---|---|---|---|
| Polyester layer A | Formulation | Polymer component | PET | PET | PET | PET | PET | PET | PET | PET | PET | Same as Layer B | Same as Layer B | PET | PET |
| | | Co-polymer [mol %] | EG | EG | EG | EG | EG | EG | EG | EG | EG 17 | | | EG | EG |
| | | IV | 0.61 | 0.61 | 0.61 | 0.61 | 0.61 | 0.61 | 0.61 | 0.61 | 0.61 | | | 0.61 | 0.61 |
| | Particles | kinds | Silica | Silica | Silica | Silica | Silica | Silica | Silica | Silica | Silica | | | Silica | Silica |
| | | D50 | 5.2 | 5.5 | 6.2 | 6.5 | 6.1 | 7 | 7.5 | 8.5 | 9 | | | 7.9 | 7.9 |
| | | Concentration (%) | 3 | 3 | 3 | 3 | 3 | 3 | 3 | 3 | 3 | | | 3 | 3 |
| | | Melting temperature [° C.] | 255 | 255 | 255 | 255 | 255 | 255 | 255 | 255 | 255 | | | 255 | 255 |
| | Ratio A layer/Total thickness (%) | | 0.8 | 0.8 | 1.5 | 1.5 | 1.5 | 1.5 | 1.5 | 1.5 | 1.5 | | | 1.5 | 1.5 |
| | Thickness (um) | | 6.7 | | 15 | 12.5 | 12.5 | 12.5 | 12.5 | 12.5 | 12.5 | | | 12.5 | 12.5 |
| Polyester layer B | Formulation | Polymer component | PET/S | PET/S | PET/S | PET/S | PET/S | PET/S | PET/S | PET/S | PET/S | PET/S | PET/S | PET/S | PET/S |
| | | Co-polymer [mol %] | SA 3 | SA 5 | SA 17 | SA 17 | SA 12 | SA 12 | SA 12 | SA 15 | SA 15 | SA 12 | SA 17.5 | SA 15 | SA 15 |
| | | IV | 0.57 | 0.57 | 0.56 | 0.56 | 0.57 | 0.57 | 0.57 | 0.56 | 0.56 | 0.55 | 0.55 | 0.57 | 0.57 |
| | Particles.1 | kinds | Silica | Silica | Silica | Silica | Silica | Silica | Silica | Silica | Silica | Silica | Silica | Silica | Silica |
| | | D50 | 5.2 | 5.5 | 6.2 | 6.5 | 3 | 3.2 | 6.5 | 8.5 | 3.5 | 2.5 | 3.5 | 3.5 | 3.5 |
| | | Concentration (%) | 0.05 | 0.05 | 0.05 | 0.05 | 2.11 | 2.11 | 0.05 | 0.15 | 2.64 | 0.05 | 6 | 0.05 | 0.05 |
| | Particles 2 | kinds | TiO2 | TiO2 | TiO2 | TiO2 | — | — | TiO2 | TiO2 | — | BaSO4 | BaSO4 | TiO2 | TiO2 |
| | | D50 | 0.3 | 0.3 | 0.3 | 0.3 | — | — | 0.3 | 0.3 | — | 0.7 | 0.7 | 0.3 | 0.3 |
| | | Concentration (%) | 6 | 8 | 8 | 8 | — | — | 4 | 12 | — | 3 | 3 | 6 | 6 |
| | Additional material | | — | — | — | — | — | — | IA (4.5 mol %) | — | IA (15 mol %) | — | — | PBT (50 wt %) | PBT/I 190/210 |
| | Melting temperature [° C.] | | 230 | 222 | 192 | 192 | 205 | 205 | 205 | 197 | 197 | 205 | 185 | 197/210 | |
| | Ratio B llayer/Total thidness (%) | | 10 | 8 | 6 | 8 | 8 | 9.5 | 8 | 8 | 8 | 8 | 8 | 8 | 8 |
| Polyester layer C | Formulation | Polymer component | PET/G | PET/G | PET/G | PET/G | PET/G | PET/G | PET/G | PET/G | PET/G | PET/G | PET/G | PET/G | PET/G |
| | | Co-polymer [mol %] | CHDM 22 | CHDM 22 | CHDM 28 | CHDM 28 | CHDM 28 | CHDM 15 | CHDM 28 | CHDM 28 | CHDM 16.5 | CHDM 24 | CHDM 33 | CHDM 34 | CHDM 33 |
| | | IV | 0.72 | 0.72 | 0.72 | 0.72 | 0.72 | 0.72 | 0.75 | 0.75 | 0.69 | 0.75 | 0.75 | 0.78 | 0.78 |
| | Particles | kinds | — | — | — | — | — | Silica | — | — | — | — | — | — | — |
| | | D50 | — | — | — | — | — | 3.2 | — | — | — | — | — | — | — |
| | | Concentration (%) | — | — | — | — | — | 0.99 | — | — | — | — | — | — | — |
| | Additional material (mol %) | | — | — | — | — | — | — | — | — | — | — | — | — | — |
| | Melting temperature [° C.] | | 83.3 | 80 | 60 | 58 | 58 | 79.2 | 58 | 58 | 58 | 49 | 52 | 52 | 50 |
| | Ratio C layer/Total thidness (%) | | 1.2 | 1.2 | 2.5 | 2.5 | 2.5 | 1.0 | 2.5 | 2.5 | 2.5 | 2.5 | 2.5 | 2.5 | 2.5 |
| | Total thickness (um) | | 10 | 12 | 25 | 20.8 | 20.8 | 8.3 | 20.8 | 20.8 | 20.8 | 20.8 | 20.8 | 20.8 | 20.8 |
| | Surface tension (mN/m) | | 12 | 10 | 10 | 12 | 12 | 12 | 12 | 12 | 12 | 12 | 12 | 12 | 12 |
| Film | IV | | 58 | 58 | 58 | 58 | 58 | 58 | 58 | 58 | 58 | 49 | 52 | 52 | 50 |
| | Crystallinity ratio(%) | | 0.6 | 0.58 | 0.61 | 0.58 | 0.58 | 0.59 | 0.6 | 0.58 | 0.58 | 0.55 | 0.57 | 0.56 | 0.56 |
| | TLT (%) | | 22 | 23 | 19 | 18 | 23 | 22 | 22 | 21 | 21 | 13 | 13 | 22 | 21 |
| | Haze (%) | | 62 | 60.9 | 61.5 | 60.8 | 83.6 | 85.7 | 79.2 | 59.2 | 86.2 | 69.6 | 70.2 | 67.4 | 68.5 |
| | | | 97.3 | 98.6 | 96.1 | 97.9 | 70.2 | 67.8 | 58.9 | 99.5 | 75.2 | 83.5 | 85.1 | 90.6 | 93.1 |
| Lamination result | Sealing Temperature - T° C. | | 140 | 140 | 140 | 140 | 140 | 140 | 140 | 140 | 140 | 140 | 140 | 140 | 140 |
| | Sealing force (N/38 mm) | | 6.4 | 6.0 | 7.9 | 8.9 | 6.2 | 4.1 | 6.7 | 8.9 | 8.8 | 5.2 | 7.5 | 8.5 | 8.3 |
| | Max. feathering [mm] | | 0.4 | 0.5 | 0.3 | 0.3 | 0.4 | 0.5 | 0.4 | 0.3 | 0.3 | 0.3 | 0.4 | 0.3 | 0.3 |
| | Tear resistance after heat treatment 230° C. * 15 s (N/mm) | | 3.1 | 2.5 | 2.3 | 2.3 | 2.6 | 2.6 | 2.4 | 1.7 | 2.3 | 3.3 | 3.1 | 1.2 | 1.5 |

TABLE 3

| | | Comparative examples | | | | | | |
|---|---|---|---|---|---|---|---|---|
| | Items | 1 | 2 | 3 | 4 | 5 | 6 | 7 |
| Polyester layer A | Formulation | PET/IA | PET EG | PET EG | PET/G CHDM | PET EG | PET EG | PET EG |
| | Polymer compornent | IA | EG | EG | CHDM | EG | EG | EG |
| | Co-polymer [mol %] | 17 | — | — | 10.6 | — | — | — |
| | IV | 0.65 | 0.65 | 0.65 | 0.71 | 0.65 | 0.65 | 0.65 |
| | Particles. kinds | Silica | Silica | Silica | Silica | Silica | Silica | Silica |
| | D50 | 3.5 | 1.9 | 3.5 | 3.5 | 2.5 | 2.5 | 2.5 |
| | Concentration (%) | 0.05 | 0.2 | 0.66 | 0.05 | 0.2 | 0.2 | 0.2 |
| | Melting temperature [° C.] | 210 | 255 | 252 | 245 | 252 | 252 | 252 |
| | Thickness (um) | 1.5 | 2 | 1.5 | 2.4 | 1.5 | 1.5 | 1.5 |
| | Ratio A layer/Total thickness (%) | 12.5 | 16.7 | 12.5 | 20 | 12.5 | 12.5 | 12.5 |
| Polyester layer B | Formulation | PET/IA | PET/IA | PET EG | PET/G CHDM | PET/IA | PET/IA | PET/IA |
| | Polymer compornent | IA | IA | EG | CHDM | IA | IA | IA |
| | Co-polymer [mol %] | 17.5 | 10 | — | 5 | 17 | 15 | 12 |
| | IV | 0.65 | 0.65 | 0.65 | 0.68 | 0.65 | 0.65 | 0.65 |
| | Particles.1 kinds | Silica | Silica | Silica | Silica | — | — | — |
| | D50 | 3.5 | 3.5 | 3.5 | 3.5 | — | — | — |
| | Concentration (%) | 0.05 | 0.05 | 0.66 | 0.05 | — | — | — |
| | Particles 2 kinds | — | TiO2 | TiO2 | — | TiO2 | TiO2 | TiO2 |
| | D50 | — | 0.3 | 0.3 | — | 0.3 | 0.3 | 0.3 |
| | Concentration (%) | — | 12 | 8 | — | 4 | 4 | 4 |
| | Additional material | — | — | — | — | — | — | — |
| | Melting temperature [° C.] | 210 | 246 | 254 | 250 | 210 | 233 | 244 |
| | Thickness (um) | 8 | 7.5 | 8 | 7.2 | 9 | 9 | 9 |
| | Ratio B llayer/Total thickness (%) | 66.7 | 62.5 | 66.7 | 60 | 75 | 75 | 75 |
| Polyester layer C | Formulation | PET/IPA | PET/G CHDM | PET/G CHDM | PET/G CHDM | PET/IPA | PET/IPA | PET/IPA |
| | Polymer compornent | IPA | CHDM | CHDM | CHDM | IPA | IPA | IPA |
| | Co-polymer [mol %] | 17 | 28 | 28 | 22 | 17 | 15 | 12 |
| | IV | 0.65 | 0.75 | 0.75 | 0.75 | 0.65 | 0.65 | 0.65 |
| | Particles kinds | Silica | Silica | — | — | Silica | — | — |
| | D50 | 3.5 | 2.5 | — | — | 2.5 | — | — |
| | Concentration (%) | 0.05 | 0.3 | — | — | 0.2 | — | — |
| | Additional material | — | — | — | — | — | — | — |
| | Melting temperature [° C.] | 210 | — | — | — | 210 | 233 | 244 |
| | Thickness (um) | 2.5 | 2.5 | 2.5 | 2.4 | 1.5 | 1.5 | 1.5 |
| | Ratio C layer/Total thickness (%) | 20.8 | 20.8 | 20.8 | 20 | 21 | 21 | 21 |
| | Total thickness (um) | 12 | 12 | 12 | 12 | 12 | 12 | 12 |
| | Surface tension (mN/m) | 42 | 42 | 42 | 42 | 42 | 42 | 42 |
| Film | IV | 0.67 | 0.68 | 0.64 | 0.71 | 0.64 | 0.63 | 0.65 |
| | Crystallinity ratio (%) | 22 | 23 | 35 | 26 | 10.5 | 9.7 | 25.6 |
| | TLT (%) | 96.5 | 60.9 | 51.8 | 92 | 77.4 | 78.3 | 77.8 |
| | Haze (%) | 3.6 | 98.6 | 95.9 | 7.8 | 63.1 | 58.9 | 59.4 |
| AlLamination result | Sealing Temperature- T° C. | 140 | 140 | 140 | 140 | 140 | 140 | 140 |
| | Sealing forxce (N/38 mm) | 0.8 | 7.9 | 7 | 7.3 | 0.7 | 0.3 | 0.04 |
| | Max. feathering [mm] | 2.7 | 1.5 | 1.4 | 1.6 | 1.1 | 1.2 | 1.5 |
| | Tear resistance after heat treatment 230° C. * 15 s (N/mm) | 3.5 | 4.6 | 3.0 | 5.5 | 4.5 | 6.0 | 4.5 |

| | | Comparative examples | | | | | |
|---|---|---|---|---|---|---|---|
| | Items | 8 | 9 | 10 | 11 | 12 | 13 |
| Polyester layer A | Formulation | PET EG | PET/IA | PET/IA | PET/IA | PET/IA | PET/IA |
| | Polymer compornent | EG | IA | IA | IA | IA | IA |
| | Co-polymer [mol %] | — | 8.5 | 8.5 | 8.5 | 8.5 | 8.5 |
| | IV | 0.65 | 0.65 | 0.65 | 0.65 | 0.65 | 0.65 |
| | Particles. kinds | Silica | Silica | Silica | Silica | Silica | Silica |
| | D50 | 2.5 | 3.5 | 3.5 | 3.5 | 3.5 | 3.5 |
| | Concentaration (%) | 0.2 | 3 | 3 | 3 | 3 | 3 |
| | Melting temperature [° C.] | 252 | 248 | 248 | 248 | 248 | 248 |
| | Thickness (um) | 1.5 | 1.7 | 1.7 | 1.7 | 1.7 | 1.7 |
| | Ratio A layer/Total thickness (%) | 12.5 | 10 | 10 | 10 | 10 | 10 |
| Polyester layer B | Formulation | PET/IA | PET/IA | PET/IA | PET/IA | PET/IA | PET/IA |
| | Polymer compornent | IA | IA | IA | IA | IA | IA |
| | Co-polymer [mol %] | 12 | 8.5 | 8.5 | 8.5 | 8.5 | 8.5 |
| | IV | 0.65 | 0.65 | 0.65 | 0.65 | 0.65 | 0.65 |
| | Particles.1 kinds | — | Silica | Silica | Silica | Silica | Silica |
| | D50 | — | 3.5 | 3.5 | 3.5 | 3.5 | 6 |
| | Concentration (%) | — | 1.5 | 3 | 3 | 0.05 | 3 |
| | Particles 2 kinds | TiO2 | — | — | — | — | — |
| | D50 | 0.3 | — | — | — | — | — |
| | Concentration (%) | 4 | — | — | — | — | — |
| | Additional material | PBT (27%) | — | — | PBT (25%) | PBT (50%) | — |
| | Melting temperature [° C.] | 244 | 248 | 248 | 216/241 | 215/241 | 248 |
| | Thickness (um) | 9 | 13.6 | 13.6 | 13.6 | 13.6 | 13.6 |
| | Ratio B llayer/Total thickness (%) | 75 | 80 | 80 | 80 | 80 | 80 |

TABLE 3-continued

| | | | | | | | |
|---|---|---|---|---|---|---|---|
| Polyester layer C | Formulation | PET/I | PET/I | PET/I | PET/I | PET/I | PET/I |
| | Polymer component | IPA | IPA | IPA | IPA | IPA | IPA |
| | Co-polymer [mol %] | 12 | 8.5 | 8.5 | 8.5 | 8.5 | 8.5 |
| | IV | 0.65 | 0.65 | 0.65 | 0.65 | 0.65 | 0.65 |
| | Particles   kinds | — | Silica | Silica | Silica | Silica | Silica |
| | D50 | — | 3.5 | 3.5 | 3.5 | 3.5 | 3.5 |
| | Concentaration (%) | — | 3 | 3 | 3 | 3 | 3 |
| | Additional material | — | — | — | — | — | — |
| | Melting temperature [° C.] | 244 | 248 | 248 | 248 | 248 | 248 |
| | Thickness (um) | 1.5 | 1.7 | 1.7 | 1.7 | 1.7 | 1.7 |
| | Ratio C layer/Total thickness (%) | 21 | 10 | 10 | 10 | 10 | 10 |
| | Total thickness (um) | 12 | 17 | 17 | 17 | 17 | 17 |
| | Surface tension (mN/m) | 42 | 42 | 42 | 42 | 42 | 42 |
| Film | IV | 0.62 | 0.64 | 0.61 | 0.62 | 0.62 | 0.62 |
| | Crystallinity ratio (%) | 22.1 | 27.6 | 29.1 | 9.6 | 13.8 | 26.3 |
| | TLT (%) | 77.4 | 88.6 | 86.7 | 84.5 | 91.1 | 82.2 |
| | Haze (%) | 60.9 | 67.3 | 68.5 | 69.6 | 58.1 | 65.3 |
| AlLamination result | Sealing Temperature- T° C. | 140 | 140 | 140 | 140 | 140 | 140 |
| | Sealing forxce (N/38 mm) | 0.1 | 0 | 0 | 0 | 0 | 0 |
| | Max. feathering [mm] | 1.2 | 3.2 | 1.4 | 1.3 | 1.0 | 3.5 |
| | Tear resistance after heat treatment 230° C. * 15 s (N/mm) | 5.1 | 3.8 | 3.2 | 3.0 | 1.0 | 1.0 |

TABLE 4

| | | Comparative examples | | | | | | |
|---|---|---|---|---|---|---|---|---|
| | Items | 14 | 15 | 16 | 17 | 18 | 19 | 20 |
| Polyester layer A | Formulation | PET/I | PET | PET | PET/G | PET | PET | PET |
| | Polymer component | IA | EG | EG | CHDM | EG | EG | EG |
| | Co-polymer [mol %] | 17 | — | — | 10.6 | — | — | — |
| | IV | 0.65 | 0.65 | 0.81 | 0.68 | 0.65 | 0.65 | 0.65 |
| | Particles.   kinds | silica | silica | silica | silica | silica | silica | silica |
| | D50 | 3.5 | 1.9 | 3.5 | 3.5 | 2.5 | 2.5 | 2.5 |
| | Concentration (%) | 0.05 | 0.2 | 0.66 | 0.05 | 0.2 | 0.2 | 0.2 |
| | Melting temperature [° C.] | 210 | 255 | 252 | 245 | 252 | 252 | 252 |
| | Thickness (um) | 1.5 | 2 | 1.5 | 2.4 | 1.5 | 1.5 | 1.5 |
| | Ratio A layer/Total thickness (%) | 12.5 | 16.7 | 12.5 | 20 | 12.5 | 12.5 | 12.5 |
| Polyester layer B | Formulation | PET/N | PET/N | PET/N | PET/N | PET/N | PET/N | PET/N |
| | Polymer component | NDC | NDC | NDC | NDC | NDC | NDC | NDC |
| | Co-polymer [mol %] | 5 | 5 | 5 | 5 | 5 | 5 | 5 |
| | IV | 0.65 | 0.65 | 0.8 | 0.66 | 0.65 | 0.65 | 0.65 |
| | Particles.1   kinds | Slica | Silica | Slica | Slica | — | — | — |
| | D50 | 3.5 | 3.5 | 3.5 | 3.5 | — | — | — |
| | Concentaration (%) | 0.05 | 0.05 | 0.66 | 0.05 | — | — | — |
| | Particles 2   kinds | — | TiO2 | TiO2 | — | TiO2 | TiO2 | TiO2 |
| | D50 | — | 0.3 | 0.3 | — | 0.3 | 0.3 | 0.3 |
| | Concentration (%) | — | 12 | 8 | — | 4 | 4 | 4 |
| | Melting temperature [° C.] | 247 | 247 | 247 | 247 | 247 | 247 | 247 |
| | Thickness (um) | 8 | 7.5 | 8 | 7.2 | 9 | 9 | 9 |
| | Ratio B layer/Total thickness (%) | 66.7 | 62.5 | 66.7 | 60 | 75 | 75 | 75 |
| Polyester layer C | Formulation | PET/I | PET/G | PET/G | PET/G | PET/I | PET/I | PET/I |
| | Polymer compornent | IA | CHDM | CHDM | CHDM | IA | IA | IA |
| | Co-polymer [mol %] | 17 | 28 | 28 | 22 | 17 | 15 | 12 |
| | IV | 0.65 | 0.75 | 0.75 | 0.75 | 0.65 | 0.65 | 0.65 |
| | Particles   kinds | silica | Silica | — | — | silica | — | — |
| | D50 | 3.5 | 2.5 | — | — | 2.5 | — | — |
| | Concentration (%) | 0.05 | 0.3 | — | — | 0.2 | — | — |
| | Additional material | — | — | — | — | — | — | — |
| | Melting temperature [° C.] | 210 | — | — | — | 210 | 233 | 244 |
| | Thickness (um) | 2.5 | 2.5 | 2.5 | 2.4 | 1.5 | 1.5 | 1.5 |
| | Ratio C layer/Total thickness (%) | 20.8 | 20.8 | 20.8 | 20 | 21 | 21 | 21 |
| | Total thickness (um) | 12 | 12 | 12 | 12 | 12 | 12 | 12 |
| | Surface tension (mN/m) | 42 | 42 | 42 | 42 | 42 | 42 | 42 |
| Film | IV | 0.65 | 0.64 | 0.71 | 0.63 | 0.64 | 0.63 | 0.65 |
| | Crystallinity ratio (%) | 19 | 23 | 21 | 20 | 24 | 23 | 23 |
| | TLT (%) | 96.4 | 59.8 | 51.7 | 92 | 77.3 | 78.3 | 77.6 |
| | Haze (%) | 4.5 | 98.5 | 95.4 | 7.8 | 62.9 | 59.1 | 59.4 |
| AlLamination result | Sealing Temperature - T° C. | 140 | 140 | 140 | 140 | 140 | 140 | 140 |
| | Sealing force (N/38 mm) | 0.7 | 7.5 | 7.2 | 7.1 | 0.6 | 0.3 | 0.1 |
| | Max. feathering [mm] | 2.5 | 1.7 | 3.5 | 1.8 | 1.3 | 1.1 | 1.6 |
| | Tear resistance after heat treatment 230° C. * 15 s (N/mm) | 4.2 | 4.6 | 5.2 | 5.5 | 4.5 | 6.0 | 4.5 |

TABLE 4-continued

|  |  | Comparative examples | | | | | |
| --- | --- | --- | --- | --- | --- | --- | --- |
|  | Items | 21 | 22 | 23 | 24 | 25 | 26 |
| Polyester layer A | Formulation | PET | PET/I | PET/I | PET/I | PET/I | PET/I |
|  | Polymer component | EG | IA | IA | IA | IA | IA |
|  | Co-polymer [mol %] | — | 8.5 | 8.5 | 8.5 | 8.5 | 8.5 |
|  | IV | 0.65 | 0.65 | 0.65 | 0.65 | 0.65 | 0.65 |
|  | Particles. kinds | silica | silica | silica | silica | silica | silica |
|  | D50 | 2.5 | 3.5 | 3.5 | 3.5 | 3.5 | 3.5 |
|  | Concentration (%) | 0.2 | 3 | 3 | 3 | 3 | 3 |
|  | Melting temperature [° C.] | 252 | 248 | 248 | 248 | 248 | 248 |
|  | Thickness (um) | 1.5 | 1.7 | 1.7 | 1.7 | 1.7 | 1.7 |
|  | Ratio A layer/Total thickness (%) | 12.5 | 10 | 10 | 10 | 10 | 10 |
| Polyester layer B | Formulation | PET/N | PET/N | PET/N | PET/N | PET/N | PET/N |
|  | Polymer component | NDC | NDC | NDC | NDC | NDC | NDC |
|  | Co-polymer [mol %] | 5 | 5 | 5 | 5 | 5 | 5 |
|  | IV | 0.65 | 0.65 | 0.65 | 0.65 | 0.65 | 0.65 |
|  | Particles.1 kinds | — | Slica | Slica | Slica | Slica | Slica |
|  | D50 | — | 3.5 | 3.5 | 3.5 | 3.5 | 6 |
|  | Concentaration (%) | — | 1.5 | 3 | 3 | 0.05 | 3 |
|  | Particles 2 kinds | TiO2 | — | — | — | — | — |
|  | D50 | 0.3 | — | — | — | — | — |
|  | Concentration (%) | 4 | — | — | — | — | — |
|  | Melting temperature [° C.] | 247 | 247 | 247 | 247 | 247 | 247 |
|  | Thickness (um) | 9 | 13.6 | 13.6 | 13.6 | 13.6 | 13.6 |
|  | Ratio B layer/Total thickness (%) | 75 | 80 | 80 | 80 | 80 | 80 |
| Polyester layer C | Formulation | PET/I | PET/I | PET/I | PET/I | PET/I | PET/I |
|  | Polymer compornent | IA | IA | IA | IA | IA | IA |
|  | Co-polymer [mol %] | 12 | 8.5 | 8.5 | 8.5 | 8.5 | 8.5 |
|  | IV | 0.65 | 0.65 | 0.65 | 0.65 | 0.65 | 0.65 |
|  | Particles kinds | — | silica | silica | silica | silica | silica |
|  | D50 | — | 3.5 | 3.5 | 3.5 | 3.5 | 3.5 |
|  | Concentration (%) | — | 3 | 3 | 3 | 3 | 3 |
|  | Additional material | — | — | — | — | — | — |
|  | Melting temperature [° C.] | 244 | 248 | 248 | 248 | 248 | 248 |
|  | Thickness (um) | 1.5 | 1.7 | 1.7 | 1.7 | 1.7 | 1.7 |
|  | Ratio C layer/Total thickness (%) | 21 | 10 | 10 | 10 | 10 | 10 |
|  | Total thickness (um) | 12 | 17 | 17 | 17 | 17 | 17 |
|  | Surface tension (mN/m) | 42 | 42 | 42 | 42 | 42 | 42 |
| Film | IV | 0.62 | 0.64 | 0.61 | 0.61 | 0.64 | 0.64 |
|  | Crystallinity ratio (%) | 22 | 22 | 22 | 21 | 22 | 21 |
|  | TLT (%) | 77.4 | 88.4 | 86.9 | 84.3 | 90.1 | 82.4 |
|  | Haze (%) | 60.9 | 67.2 | 68.3 | 69.3 | 59.1 | 65.2 |
| AlLamination result | Sealing Temperature - T° C. | 140 | 140 | 140 | 140 | 140 | 140 |
|  | Sealing force (N/38 mm) | 0.1 | 0 | 0 | 0 | 0 | 0 |
|  | Max. feathering [mm] | 1.4 | 3.3 | 2.4 | 2.1 | 2.5 | 3.5 |
|  | Tear resistance after heat treatment 230° C. * 15 s (N/mm) | 5.1 | 3.8 | 3.2 | 3.7 | 1.3 | 1.4 |

The invention claimed is:

1. A multilayer biaxially oriented polyester film comprising successively:
   -C- at least one adhesive amorphous layer C comprising at least one amorphous copolyester, which diol units include Ethylene Glycol -EG- units and Cyclo-HexaneDiMethanol -CHDM- units;
   -B- at least one layer B comprising:
      at least one copolyester CP1, which diol units include Ethylene Glycol -EG- units and which acid units include Terephthalic Acid -TA- units and units of at least one Dicarboxylic Acid Different From Terephthalic Acid [DADFTA units], said DADFTA units being chosen from the group consisting of Isophthalic Acid -IA- units, Sebacic Acid -SA- units, and mixtures thereof;
   and
   -A- at least one layer A, identical or different from the layer B and comprising at least one polyester, and optionally at least one copolyester CP2,
   wherein
   i. the concentration of the CHDM units in the layer C is between 15 and 50 mol %;
   ii. the melting temperature of the layer B is between 18° and 245° C.;
   iii. at least one of the layers C, B or A incorporates filler particles having a median diameter D50 in the range of 3.0-15.0 μm.

2. The film according to claim 1, wherein the concentration of the DADFTA units in the layer B is greater than or equal to 1 mol %.

3. The film according to claim 1, wherein the layer B and/or the layer A comprises:
   at least one copolyester CP3 different from CP1 and/or from CP2.

4. The film according to claim 1, wherein the layer A is different from the layer B, wherein the layer A is a crystallizable layer of polyester resin including at least 50% by weight of Poly-Ethylene Terephthalate (PET).

5. The film according to claim 1, wherein at least one of the layers C, B, or A, includes fine particles different from the filler particles.

6. The film according to claim 1, wherein the filler particles are chosen from inorganic and/or organic particles in the group consisting of: titanium oxide, barium sulfate, silicon dioxide, aluminum oxide particles, zirconium oxide, tin oxide, calcium carbonate, calcium phosphate, zeolite, hydroxyapatite, aluminum silicate, wet-based and dry-based colloidal silica and alumina, polymer including styrene, silicone, polyacrylic acid, polymethacrylic acid, polyester, polymer including divinyl benzene and mixtures thereof.

7. The film according to claim 6, wherein the filler particles includes barium sulfate and/or titanium oxide particles.

8. The film according to claim 6, wherein the filler particles include $SiO_2$ particles which have a median diameter D50 in the range of 3.0-12.0 μm.

9. The film according to claim 1, wherein the whole intrinsic viscosity (IV) of any one of the layers C, B or A is between 0.45 to 0.70 dl/g of the film.

10. The film according to claim 1, wherein the C-layer thickness is within the range of 0.3-6.0 μm.

11. The film according to claim 1, wherein the C-layer thickness is within the range of 0.5-40% of the overall film thickness.

12. The film according to claim 1, wherein a decrease in tear resistance measured by Elmendorf tear resistance testing machine is within the range of <5 N/mm.

13. The film according to claim 1, wherein a decrease of feathering after lamination with metal substrates is within the range of <1.0 mm.

14. The film according to claim 1, wherein an increase of a sealing force is within the range of >4 N/38 mm.

15. The film according to claim 1, wherein a global crystallinity ratio compared with a full crystallized PET measured by DSC, is within the range of <30%.

16. The film according to claim 1, wherein a surface of the C-layer opposite to a surface of the C-layer which is bonded to the B-layer, has been treated by surface treatment to increase its surface tension within the range of >40 mN/m.

17. A method for manufacturing a multilayer biaxially oriented polyester film according to claim 1, said manufacturing method comprising:
  i) the synthesis or the implementation of the polyesters, as defined in claim 1;
  (ii) optional pre-drying of said polyesters;
  (iii) heating the polyesters to melt them and make them malleable;
  (iv) extruding the molten polyesters in a multilayer film;
  (v) rapid cooling (quenching) and the solidification of the multilayer film;
  (vi) the bi-axial stretching in the longitudinal and transverse directions of the multilayer film, at a given stretching temperature Ts;
  (vii) heating the biaxially stretched film at a given heating temperature Th.

18. A laminate metal/multilayer biaxially oriented polyester film comprising a metallic support, said support being bonded to a film according to claim 1.

19. A method for manufacturing a laminate according to claim 18, wherein the multilayer biaxially oriented polyester film is laminated with a metallic support, said lamination comprising an induction heating step at a temperature T1 lower than or equal to 270° C., an IR annealing step at a temperature T2 lower than or equal to 270° C., and a cooling step.

20. A container made from the laminate according to claim 18 wherein the metallic support is the external wall of said container.

* * * * *